United States
Kawazu

[11] 3,929,397
[45] Dec. 30, 1975

[54] PROJECTION LENS
[75] Inventor: Motoaki Kawazu, Tokyo, Japan
[73] Assignee: Kabushiki Kaisha Ricoh, Tokyo, Japan
[22] Filed: July 1, 1974
[21] Appl. No.: 484,975

[30] Foreign Application Priority Data
Aug. 30, 1973 Japan.............................. 48-96726

[52] U.S. Cl. ............................................... 350/216
[51] Int. Cl.² .......................................... G02B 9/60
[58] Field of Search ............ 350/214, 215, 216, 220

[56] References Cited
UNITED STATES PATENTS
3,043,192  7/1962  Eismann et al. ................. 350/216 X
FOREIGN PATENTS OR APPLICATIONS
641,626  8/1950  United Kingdom................. 350/216

*Primary Examiner*—John K. Corbin
*Attorney, Agent, or Firm*—Edward F. Connors

[57] ABSTRACT

A diverging lens is spaced between a converging lens as an objective lens and the viewing screen, and two doublet lenses are spaced between the diverging lens and the converging lens. The projector illumination system focusses an image of the light source into the projection lens aperture which is spaced between the two doublet lenses. A meniscus lens is spaced between the converging lens and the slide being projected to increase the back focus distance to a value greater than the focal length of the projection lens so that the image of the light source fills the entire aperture, and to correct coma, astigmatism and distortion.

2 Claims, 5 Drawing Figures

SPHERICAL ABERRATION

ASTIGMATISM

DISTORTION

PROJECTION LENS

The present invention relates to a projection lens having a long back focus distance which is selected so that an image of the projector light source is focussed into the aperture of the projection lens by the projector illumination system to completely fill the aperture.

Projectors for reading, projecting and printing slides, microfilm and the like generally comprise an illuminating system to illuminate the film from the back and a projection lens to focus an image of the film onto a viewing screen, etc. In this type of device, it is most desirable to employ condensers in the illuminating system which focus an image of the projector light source into the aperture of the projection lens. If the image of the light source is able to completely fill the projection lens aperture, the brightness of the projected image on the viewing screen is maximized. However, difficulties have been inherent in prior art projectors in that the possible configurations of the condensers and their relative spacings in the projector are rather limited, and prior art projection lenses are not suited to the limitations of the condensers. More specifically, in this type of projector, it is necessary to provide a relatively long back focus distance in order for a projection lens of the required focal length to be completely compatible with the configuration of the projector illumination system, which is not optimally possible with prior art projection lenses. The result is that a compromise is made which reduces the efficiency of the illumination system.

It is therefore an object of the present invention to provide a projection lens having a long back focus distance to make optimum use of a projector illumination system.

It is another object of the present invention to provide a projection lens having a diverging lens spaced between a converging lens and a viewing screen and comprising a meniscus lens spaced between the converging lens and the slide being projected to increase the back focus distance of the projection lens to a value compatible with a projector illumination system and correct spherical and oblique aberrations occuring in the projection lens.

The above and other objects, features and advantages of the present invention will become clear from the following detailed description taken with the accompanying drawings, in which.

Figure 1:
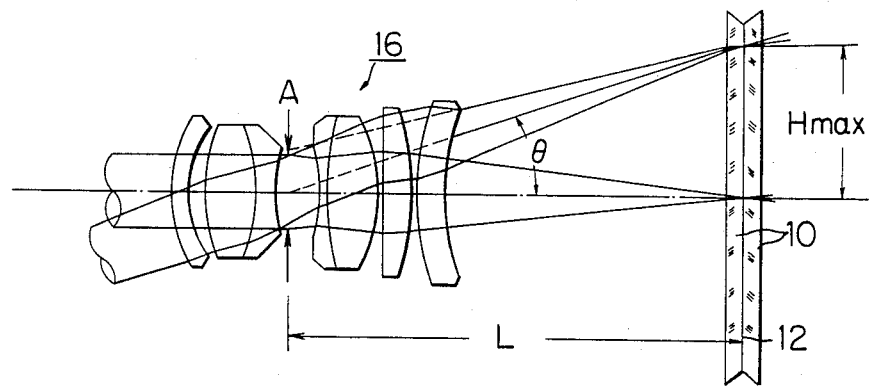
FIG. 1 is a longitudinal sectional view of a preferred embodiment of a projection lens according to the present invention showing the paths of light rays from a document being projected passing through the lens.
Figure 2:
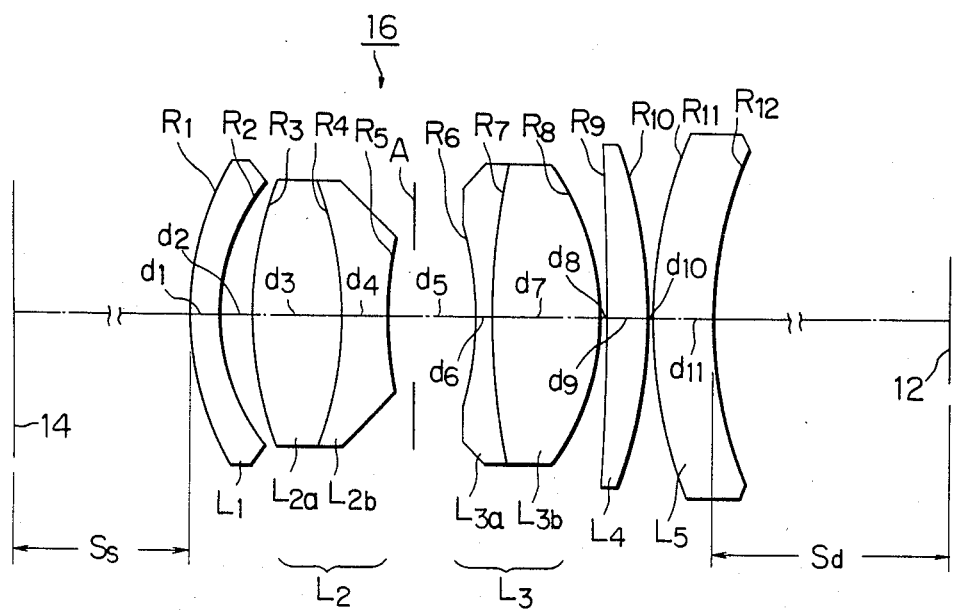
FIG. 2 is an enlarged view of the projection lens shown in FIG. 1.

Referring now to the drawings and more particularly to FIGS. 1 and 2, a projection lens 16 embodying the present invention is supported by a projector body (not shown) which comprises two glass sheets 10 which clamp therebetween a document 12 being projected such as a slide, microfilm strip, translucent drawing on tracing paper, etc. The projector also comprises an illumination system (not shown) located to the right of the document 12 as viewed in FIG. 1, which includes a light source and condensers to illuminate the right side of the document 12. A viewing surface such as a viewing screen 14 is provided, onto which an image of the document 12 is focussed by the projection lens 16.

The projection lens 16 itself comprises lenses $L_1$, $L_2$, $L_3$, $L_4$ and $L_5$, the lens $L_2$ being formed of two lens elements $L_{2a}$ and $L_{2b}$ cemented together, and the lens $L_3$ being formed of two lens elements $L_{3a}$ and $L_{3b}$ cemented together. The main lens group of the projection lens 16 is constituted by the lens $L_4$, which is a converging lens and acts as the objective lens, and the lens $L_1$, which is a diverging lens and acts as an amplifier in a reversed telephoto configuration. The novel feature of the present invention resides in the provision of the lens $L_5$, as will be described in detail below.

The lenses $L_1$ to $L_5$ are arranged in numerical order from the front of the projection lens 16 (facing the viewing screen 14) toward the back of the lens 16 (facing the document 12). The lens $L_1$ is a diverging meniscus lens having its convex surface constituting the front of the projection lens 16 and its concave surface facing the rear of the projection lens 16. The lens $L_2$ is a doublet constituted by the lens elements $L_{2a}$ and $L_{2b}$, which are cemented together. The element $L_{2a}$ is a double convex lens and the element $L_{2b}$ is a double concave lens. The lens $L_3$ is also a doublet constituted by the lens element $L_{3a}$ and $L_{3b}$ cemented together. The element $L_{3a}$ is a double concave lens and the element $L_{3b}$ is a double convex lens. An aperture A, which may be an iris diaphragm, is spaced between the doublet lenses $L_2$ and $L_3$.

The lens $L_4$ is a converging meniscus lens having its concave surface facing the front of the projection lens 16 and its convex surface facing the rear of the projection lens 16. The lens $L_5$ is a meniscus lens having its convex surface facing the front of the projection lens 16 and its concave surface facing the rear of the projection lens 16. The designation $d_1$ represents the axial thickness of the lens $L_1$, $d_2$ the air space between the lenses $L_1$ and $L_2$, $d_3$ the thickness of the lens element $L_{2a}$, $d_4$ the thickness of the lens element $L_{2b}$, $d_5$ the air space (aperture space) between the lenses $L_2$ and $L_3$, $d_6$ the thickness of the lens element $L_{3a}$, $d_7$ the thickness of the lens element $L_{3b}$, $d_8$ the air space between the lenses $L_3$ and $L_4$, $d_9$ the thickness of the lens $L_4$, $d_{10}$ the air space between the lenses $L_4$ and $L_5$ and $d_{11}$ the thickness of the lens $L_5$. $R_1$ represents the radius of curvature of the convex surface of the lens $L_1$, $R_2$ that of the concave surface of the lens $L_1$, $R_3$ that of the front convex surface of the lens element $L_{2a}$, $R_4$ that of the rear convex surface of the lens element $L_{2a}$ and the front concave surface of the lens element $L_{2b}$, $R_5$ that of the rear concave surface of the lens element $L_{2b}$, $R_6$ that of the front concave surface of the lens element $L_{3a}$, $R_7$ that of the rear concave surface of the lens element $L_{3a}$ and the front convex surface of the lens element $L_{3b}$, $R_8$ that of the rear convex surface of the lens element $L_{3b}$, $R_9$ that of the concave surface of the lens $L_4$, $R_{10}$ that of the convex surface of the lens $L_4$, $R_{11}$ that of the convex surface of the lens $L_5$ and $R_{12}$ that of the concave surface of the lens $L_5$.

The distance between the front surface of the lens $L_1$ and the viewing screen 14 along the axis of the projection lens 16 is designated as $S_t$ and the distance between the rear surface of the lens $L_5$ and the document 12 measured along the axis of the projection lens 16 (the back focus distance) is designated as $S_d$. The distance between the aperture A and the document 12 is designated as L, and the focal length of the projection lens 16 is represented as $f$.

In operation, the illumination system of the projector focusses an image of the projector light source into the aperture A in such a manner as to substantially fill the aperture A to provide 100 percent efficient use of the illumination of the light source. In a projector of the type to which the present invention is directed, in order to make optimum use of the illumination system, the back focus distance $S_d$ must be longer than is possible with prior art projection lenses. As a practical example, the distance from the center to the extreme edge of the document 12 is represented as $H_{max}$, and has the value $0.47f$. The required angle $\theta$ between the axis of the projection lens 16 and a line through the center of the aperture A and the extreme edge of the document 12 is taken in this example as 18°. The distance L then becomes $L=1.45f$, which is longer than the focal length $f$ of the projection lens 16, and is not possible with prior art projection lenses. If, in a prior art projection lens of the type shown, the thickness of rear lens elements such as the doublet lens $L_3$ is increased in order to provide the distance $L=1.45$, the rear elements would become so thick that it would be impossible to correct for spherical and oblique aberrations. However, in the projection lens 16 according to the present invention, due to the provision of the meniscus lens $L_5$ behind the converging meniscus lens $L_4$, it becomes possible to optimally select the distance L at a large value such as $1.45f$ and still effectively correct for spherical and oblique aberrations inherent in components of the projection lens 16.

It has been confirmed experimentally that the projection lens 16 as shown in the drawings can provide a distance $L=1.45$ if the following parameters are maintained within the limits indicated below.

$$1.3 < \frac{R_1}{R_2} < 1.8 \quad (1)$$

$$0.8 < \frac{R_5}{R_3} < 1.3 \quad (2)$$

$$6.0 < \frac{R_9}{R_{10}} < 6.6 \quad (3)$$

$$0.8 < \frac{R_{11}}{R_{12}} < 1.4 \quad (4)$$

$$0.18f < d_3 + d_4 < 0.26f \quad (5)$$
$$0.15f < d_6 + d_7 < 0.23f \quad (6)$$

Relations (1) and (3) play the major role in determining the focal length $f$ of the projection lens 16 and also the back focus distance $S_d$ since the converging meniscus lens $L_4$ and the diverging meniscus lens $L_1$ are the major elements in the reversed telephoto configuration. Elongation of the back focus distance $S_d$ and optimal selection thereof is obtained through relation (4). It will be noticed that the ratio $R_{11}/R_{12}$ can be either smaller or greater than unity, selected in conjunction with the other lens elements. This is because spherical and oblique aberrations introduced by increasing the radii of curvature and thicknesses of the lenses $L_1$ to $L_4$ beyond the limits of conventional projection lenses can be pre-corrected through suitable selection of the configuration of the meniscus lens $L_5$.

More specifically, the lower limit of relation (1) was determined experimentally as the minimum ratio at which a back focus distance $S_d$ suitable for a projection lens application can be provided in conjunction with possible configurations of the other lens elements. The upper limit of relation (1) is the maximum ratio at which spherical aberration can be corrected in conjunction with relation (6).

The lower limit of relation (2) is similar to the lower limit of relation (1), and the upper limit of relation (2) is the maximum ratio at which astigmatism can be corrected in conjunction with relations (4) and (6).

The lower limit of relation (3) is similar to that of relation (1), and the upper limit is the maximum ratio at which spherical aberration can be corrected in conjunction with relations (1) and (6).

The lower limit of relation (4) is similar to that of relation (1), and the upper limit is the maximum ratio at which the oblique aberrations coma, astigmatism and distortion introduced by increasing the radii of curvature and thicknesses of the successive lenses $L_1$ and $L_4$ beyond their normal limits can be corrected by means of the meniscus lens $L_5$.

Relation (5) is closely linked with relation (4), and involves the correction of distortion within the upper limit of relation (4). Coma introduced within the limits of relation (5) can be corrected within the limits of relation (6).

It will be appreciated that the converging meniscus lens $L_4$ acts as the objective and the converging meniscus lens $L_1$ acts as the amplifier in a reversed telephoto configuration. The doublet lens $L_2$ acts mainly to correct oblique aberrations, especially astigmatism. The doublet lens $L_3$ acts mainly to correct spherical aberration, and the meniscus lens $L_5$ is vital in adjustably increasing the back focus distance $S_d$ in conjunction with the other lenses $L_1$ to $L_4$, and in correcting for spherical and oblique aberrations introduced in the lenses $L_1$ to $L_4$, especially if the radii of curvature and thicknesses of the lenses $L_1$ to $L_4$ are increased beyond normal limits in order to increase the back focus distance $S_d$. However, the functions of the lenses $L_1$ to $L_5$ are not independent of each other, and there is considerable overlapping of function and interaction between the lenses $L_1$ to $L_5$. Relations (1) to (6) are experimental limits within which a projection lens 16 embodying the present invention is usable in practice, and the exact configuration of a projection lens 16 for a specific application must be determined empirically within the limits of relations (1) to (6). A typical example of such a detailed configuration of the projection lens 16 is tabulated below:

| Lens | | Radii of curvature | Thicknesses and air spaces | Indices of refraction | Abbe numbers |
|---|---|---|---|---|---|
| $L_1$ | | $R_1 = 0.48667$ | $d_1 = 0.04155$ | $N_1 = 1.51742$ | $V_1 = 52.17$ |
| | | $R_2 = 0.30537$ | | | |
| | | | $d_2 = 0.05477$ | Air space | |
| $L_2$ | $L_{2a}$ | $R_3 = 0.56249$ | $d_3 = 0.13975$ | $N_2 = 1.74400$ | $V_2 = 44.87$ |
| | | $R_4 = -6.5012$ | | | |
| | $L_{2b}$ | | $d_4 = 0.07932$ | $N_3 = 1.53172$ | $V_3 = 48.84$ |
| | | $R_5 = 0.58544$ | | | |

-continued

| Lens | | Radii of curvature | Thicknesses and air spaces | Indices of refraction | Abbe numbers |
|---|---|---|---|---|---|
| $L_3$ | $L_{3a}$ | $R_6 = -0.39111$ | $d_5 = 0.14541$ | Air space | |
| | | $R_7 = 1.22545$ | $d_6 = 0.02266$ | $N_4 = 1.71736$ | $V_4 = 29.49$ |
| | $L_{3b}$ | $R_8 = -0.42639$ | $d_7 = 0.16619$ | $N_5 = 1.67790$ | $V_5 = 53.44$ |
| $L_4$ | | $R_9 = -4.78781$ | $d_8 = 0.00378$ | Air space | |
| | | $R_{10} = -0.75583$ | $d_9 = 0.08309$ | $N_6 = 1.71300$ | $V_6 = 53.89$ |
| $L_5$ | | $R_{11} = 0.73750$ | $d_{10} = 0.09254$ | Air space | |
| | | $R_{12} = 0.63032$ | $d_{11} = 0.09254$ | $N_7 = 1.71270$ | $V_7 = 43.29$ | in which the focal length $f$ is taken as unity, the image to document magnification ratio is 16, $S_s = -16.3355$ and $S_d = 0.9471$. The indices of refraction of the lenses and lens elements are designated as $N_1$ to $N_7$ respectively, and the Abbe numbers as $V_1$ to $V_7$. The reference wavelength for the indices of refraction and the Abbe numbers is 587.6nm (d-line). In the above table, distances measured from right to left as viewed in FIGS. 1 and 2 and the radii of curvature of lens surfaces whose centers of curvature are spaced to the left of the surface shown are designated with negative polarity, and vice versa.

Figure 3A:
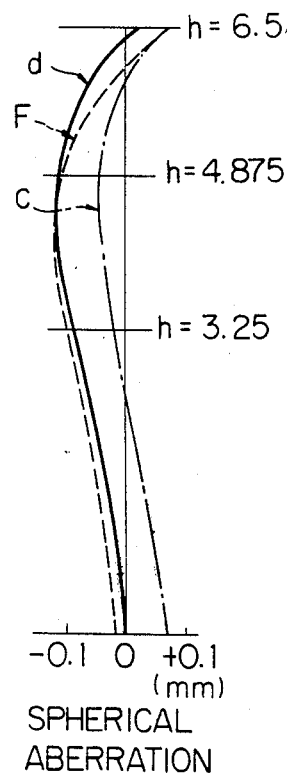
FIGS. 3a, 3b and 3c are graphical illustrations of the spherical aberration, astigmatism and distortion of a projection lens constructed in accordance with the present invention.
Figure 3B:
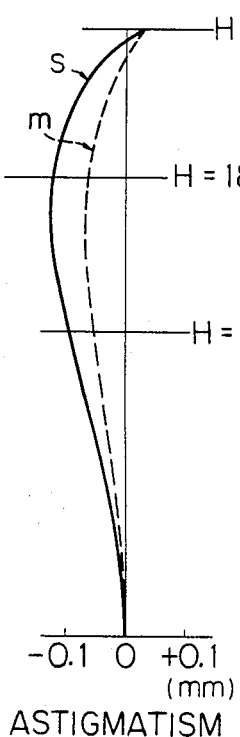
Figure 3C:
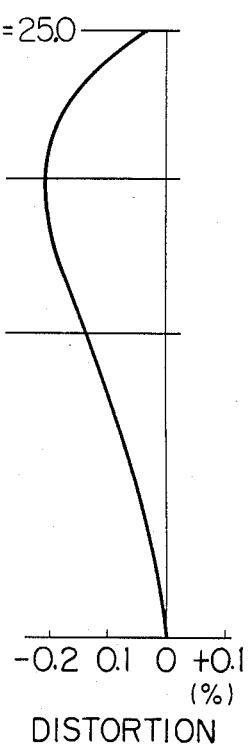

FIGS. 3a, 3b and 3c show the spherical aberration, astigmatism and distortion respectively of a projection lens 16 constructed according to the above table, in which $f = 53$, and the radii of curvature, thicknesses of the lens elements, etc. have the same proportional relationships as in the table. $H_{max} = 25.0$, and the relative aperture A in FIGS. 3b and 3c is taken as $f = 4.0$.

In FIG. 3a, the axial shift of the point of focus as a function of the radius h of the aperture A is plotted for 3 wavelengths; $d = 587.6$nm, $F = 486.1$nm and $C = 656.3$nm. In FIG. 3b, the meridional M and the sagittal S are plotted as functions of the distance H from the center of the document 12 in the plane thereof. FIG. 3c shows the distortion as a function of the distance H.

The sums of the Seidel coefficients of the aberrations in the example shown are

| $S_1$ | $S_2$ | $S_3$ | $S_4$ | $S_5$ |
|---|---|---|---|---|
| 0.1149 | −0.0456 | 0.0166 | 1.0780 | −0.4239 | where
$S_1$ is the spherical aberration
$S_2$ is the coma
$S_3$ is the astigmatism
$S_4$ is the Petzval sum and
$S_5$ is the distortion.

From the above detailed description, it will be appreciated that a projection lens embodying the present invention makes it possible to utilize the illumination system of the projector at efficiency approaching 100 percent due to the increased back focus distance made possible. A projection lens according to the present invention provides excellent resolution and freedom from distortion at a magnification of around 16 times, and is especially suitable for applications in which the angle $\theta$ is about 18° and L is in the neighborhood of 1.5. These parameters are commonly found in a microfilm reader, printer and the like, and a projection lens according to the present invention is capable of greatly increasing the efficiency of illumination when used in such a device.

What is claimed is:

1. A projection lens for a projector illumination system in which an image of a projection light source is focussed into a projection lens aperture to substantially fill the aperture, comprising, in combination:
   a diverging first meniscus lens spaced between the aperture and a viewing surface and having a convex surface facing the viewing surface and a concave surface facing a document being projected;
   a first doublet lens spaced between the aperture and the first meniscus lens having a convex surface facing the viewing surface and a concave surface facing the document;
   a second doublet lens spaced between the aperture and the document having a concave surface facing the viewing surface and a convex surface facing the document;
   a converging second meniscus lens spaced between the second doublet lens and the document having a concave surface facing the viewing surface and a convex surface facing the document; and
   a third meniscus lens spaced between the second meniscus lens and the document having a convex surface facing the viewing surface and a concave surface facing the document; whereby the radii of curvature of the surfaces of the third meniscus lens are selected to adjust the back focus distance of the projection lens to a value at which the image of the light source is focussed into the aperture and to correct, in conjunction with said other lenses, astigmatism, coma and distortion occurring in the projection lens.

2. A projection lens according to claim 1, in which the radii of curvature $R_1$ to $R_{12}$, thicknesses and interlens spacings $d_1$ to $d_{11}$, indices of refraction $N_1$ to $N_7$ and Abbe numbers $V_1$ to $V_7$ of said lenses $L_1$ to $L_5$ have substantially the values and relative proportions in the below table assuming a focal length of unity, an image to document magnification ratio of 16, an axial distance from the convex surface $R_1$ of the first meniscus lens $L_1$ to the viewing surface of −16.3355 and an axial distance from the concave surface $R_{12}$ of the third meniscus lens $L_4$ to the document of 0.9471, in which distances measured in the direction from the document toward the viewing surface are considered negative and vice versa:

| Lens | | Radius of curvature | Thicknesses and air spaces | Indices of refraction | Abbe numbers |
|---|---|---|---|---|---|
| $L_1$ | | $R_1 = 0.48667$ | $d_1 = 0.04155$ | $N_1 = 1.51742$ | $V_1 = 52.17$ |
| | | $R_2 = 0.30537$ | $d_2 = 0.05477$ | Air space | |
| $L_2$ | $L_{2a}$ | $R_3 = 0.056249$ | $d_3 = 0.13975$ | $N_2 = 1.74400$ | $V_2 = 44.87$ |
| | | $R_4 = -6.5012$ | | | |
| | $L_{2b}$ | $R_5 = 0.58544$ | $d_4 = 0.07932$ | $N_3 = 1.53172$ | $V_3 = 48.84$ |
| | | | $d_5 = 0.14541$ | Air space | |
| $L_3$ | $L_{3a}$ | $R_6 = -0.39111$ | $d_6 = 0.02266$ | $N_4 = 1.71736$ | $V_4 = 29.49$ |
| | | $R_7 = 1.22545$ | | | |
| | $L_{3b}$ | $R_8 = -0.42639$ | $d_7 = 0.16619$ | $N_5 = 1.67790$ | $V_5 = 53.44$ |
| | | | $d_8 = 0.00378$ | Air space | |
| $L_4$ | | $R_9 = -4.78781$ | $d_9 = 0.08309$ | $N_6 = 1.71300$ | $V_6 = 53.89$ |
| | | $R_{10} = -0.75583$ | $d_{10} = 0.09254$ | Air space | |
| $L_5$ | | $R_{11} = 0.73750$ | $d_{11} = 0.09254$ | $N_7 = 1.71270$ | $V_7 = 43.29$ |
| | | $R_{12} = 0.63032$ | | | | where
$L_1$ is the diverging first meniscus lens;
$L_2$ is the first doublet lens;
$L_{2a}$ is a convex lens element of the first doublet lens $L_2$ facing the viewing surface;
$L_{2b}$ is a concave lens element of the first doublet lens $L_2$ facing the document;
$L_3$ is the second doublet lens;
$L_{3a}$ is a concave lens element of the second doublet lens $L_3$ facing the viewing surface;
$L_{3b}$ is a convex lens element of the second doublet lens $L_3$ facing the document;
$L_4$ is the objective second meniscus lens;
$L_5$ is the third meniscus lens; and
the values of the indices of refraction and the Abbe numbers are based on a wavelength of 587.6nm (d-line).

* * * * *